United States Patent
Haymond

(10) Patent No.: US 9,219,516 B2
(45) Date of Patent: Dec. 22, 2015

(54) STRETCHABLE STRAP COVER FOR ELECTRONIC DEVICE

(71) Applicant: American Covers, Inc., Draper, UT (US)

(72) Inventor: Bryce Haymond, West Valley City, UT (US)

(73) Assignee: American Covers, Inc., Draper, UT (US)

( * ) Notice: Subject to any disclaimer, the term of this patent is extended or adjusted under 35 U.S.C. 154(b) by 157 days.

(21) Appl. No.: 14/247,924

(22) Filed: Apr. 8, 2014

(65) Prior Publication Data

US 2015/0288406 A1    Oct. 8, 2015

(51) Int. Cl.
| | | |
|---|---|---|
| *H04B 1/3888* | (2015.01) | |
| *A45F 5/00* | (2006.01) | |
| *A45C 13/30* | (2006.01) | |
| *B65D 25/00* | (2006.01) | |

(52) U.S. Cl.
CPC ............... *H04B 1/3888* (2013.01); *A45C 13/30* (2013.01); *A45F 5/00* (2013.01); *B65D 25/00* (2013.01); *A45F 2005/008* (2013.01)

(58) Field of Classification Search
CPC ...... H04B 1/3877; H04B 1/3888; A45F 5/00; A45F 2005/008; A45F 2005/1013; A45C 11/00; A45C 13/30; B65D 25/30
See application file for complete search history.

(56) References Cited

U.S. PATENT DOCUMENTS

| | | |
|---|---|---|
| D673,162 S | 12/2012 | Young |
| D675,828 S | 2/2013 | Baker |
| D693,580 S | 11/2013 | Baker |
| 2011/0303709 A1* | 12/2011 | Wizikowski ............... A45F 5/00 224/218 |
| 2013/0009032 A1* | 1/2013 | Polletta ................ F16M 11/041 248/440.1 |
| 2013/0048514 A1* | 2/2013 | Corcoran ............... A45C 11/00 206/45.23 |
| 2013/0213838 A1* | 8/2013 | Tsai ...................... G06F 1/1633 206/320 |
| 2014/0152034 A1* | 6/2014 | Tussy ..................... F16M 13/04 294/142 |

OTHER PUBLICATIONS

This 'Just a Loop' Cord is the Simplest iPhone Case You're Ever Going to Find; Oh Gizmo; Jan. 14, 2011.
Lightweight; www.padlette.com; accessed Mar. 18, 2014.
Crossover; www.quirky.com; iphone 5 silicone bands case; accessed Feb. 17, 2014.

* cited by examiner

*Primary Examiner* — Thanh Le
(74) *Attorney, Agent, or Firm* — Thorpe North & Western, LLP

(57) ABSTRACT

A stretchable strap cover for a handheld electronic device has a flexible and elastic pad with four apertures formed in the pad and extending through the thickness of the pad, and four straps defined between the four apertures and the perimeter of the pad. The pad has at least two configurations, including: 1) an initial configuration in which the pad is separate from the handheld electronic device, an in which the pad is unstretched with an initial unstretched perimeter, length and width, and in which the pad is flat and disposed in a flat layer having a thickness the same as the thickness of the pad, with the straps and the apertures disposed in the flat layer; and 2) an installed configuration in which the pad is coupled to the handheld electronic device, the pad being stretched and under tension, and the straps being disposed out of the flat layer.

24 Claims, 10 Drawing Sheets

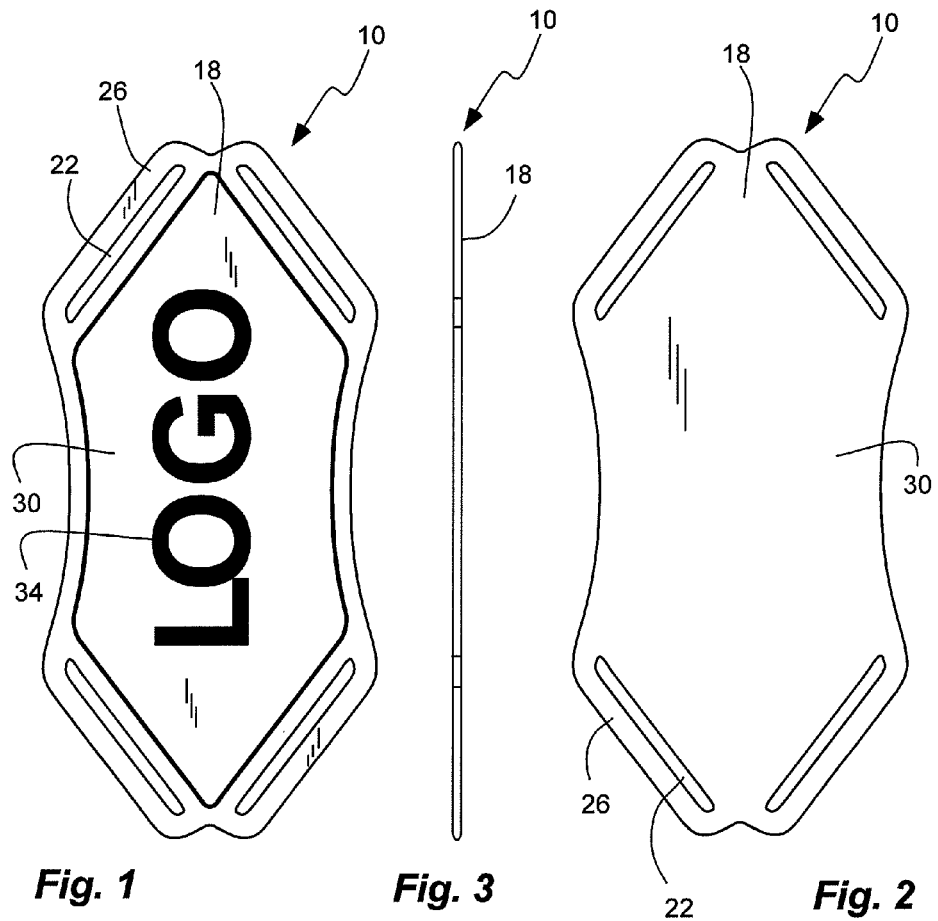

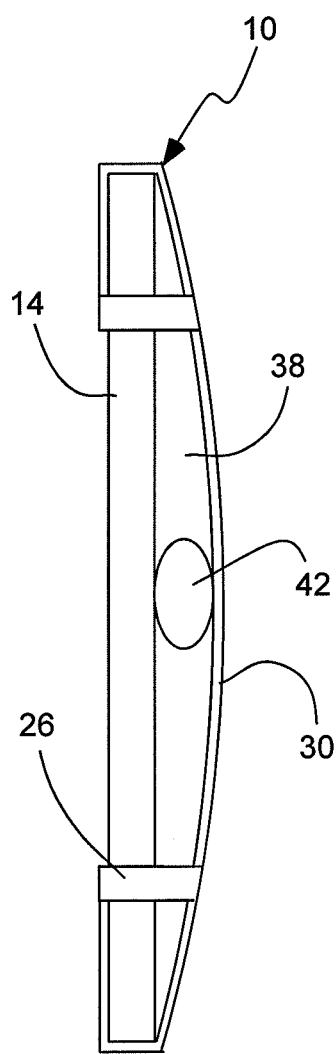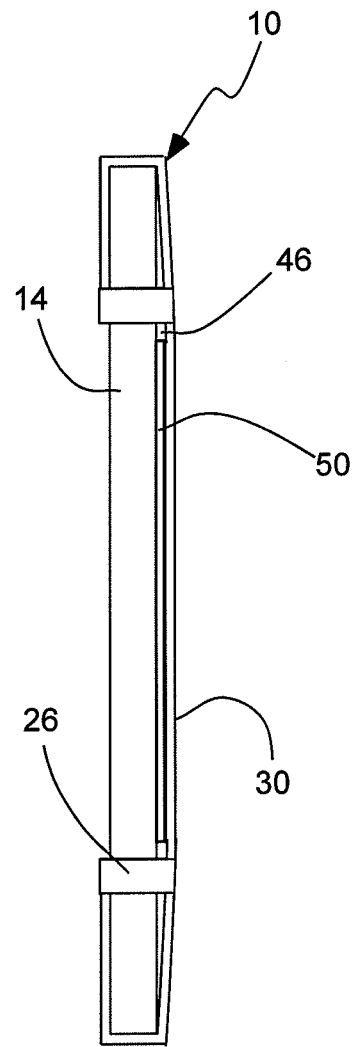
Fig. 9                    Fig. 10

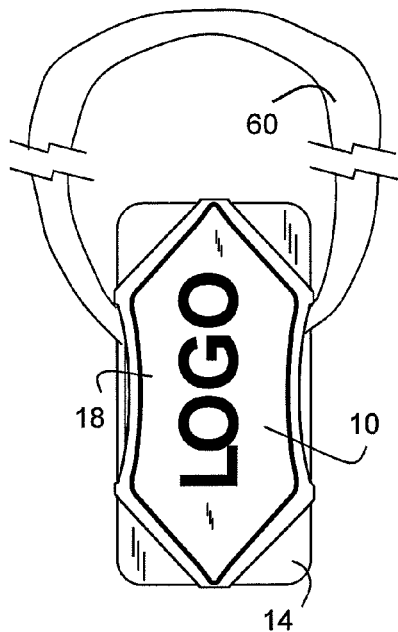
*Fig. 16a*
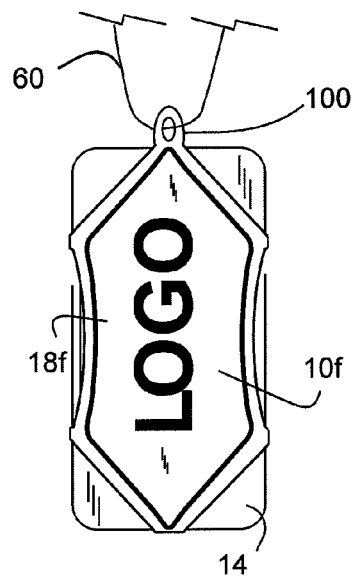
*Fig. 16b*
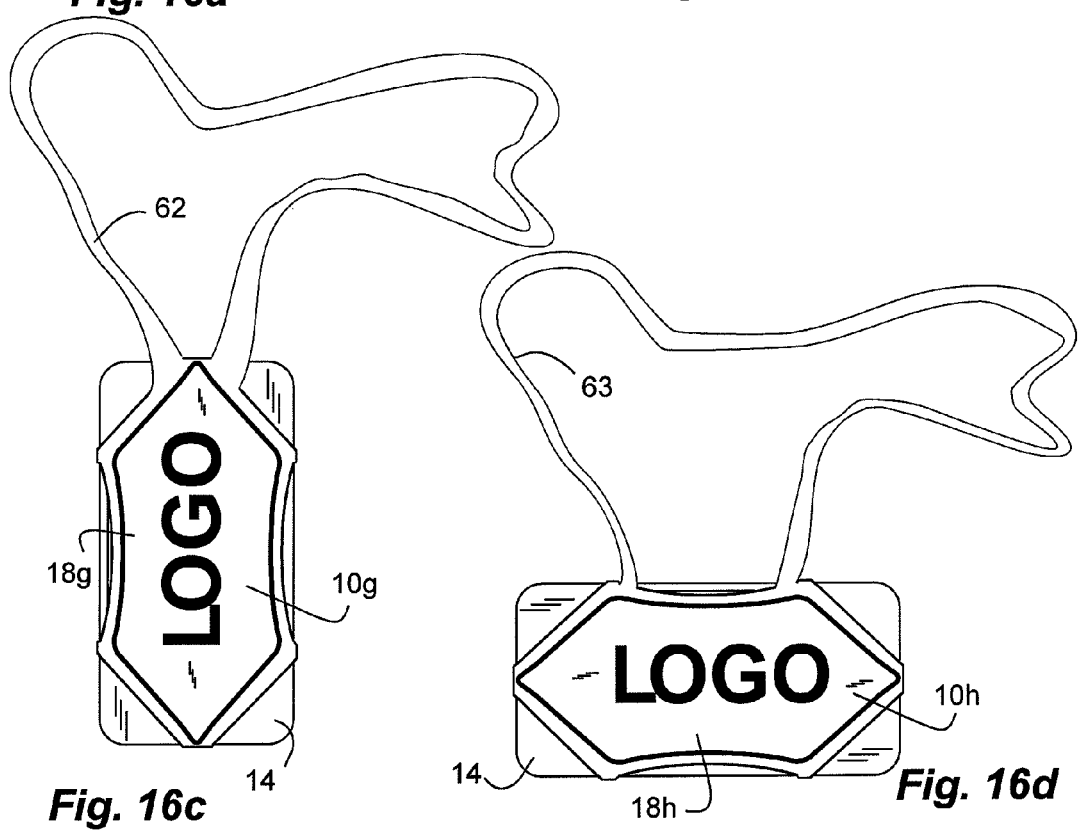
*Fig. 16c*
*Fig. 16d*

STRETCHABLE STRAP COVER FOR ELECTRONIC DEVICE

BACKGROUND

1. Field of the Invention

The present invention relates generally to a stretchable strap cover for cell phones and the like.

2. Related Art

Portable, handheld electronic devices, such as cell phones and tablets, are increasingly popular, and utilized more and more frequently. The portable and handheld nature of the devices lends them to everyday and continuous use. Such electronic devices, however, can be expensive, and prone to being dropped and damaged due to their small size, and sleek design. Thus, many people choose to place their cell phone or tablet in a case, such as a folio, that can have a cover foldable over the screen. Such covers or folios can be expensive. Electronic devices, such as cell phones, and tablets, however, come in many makes, styles, and sizes. In addition, such electronic devices, such as cell phone, are increasingly functional and replacing other devices. Many individuals, however, still choose to carry other items, such as cash, credit cards, identification cards, membership cards, etc. The improvement of cell phone accessories is an ongoing endeavor.

SUMMARY OF THE INVENTION

It has been recognized that it would be advantageous to provide a minimalistic or simple cover that can extend over different sizes and shapes of electronic devices to protect the electronic device in case of dropping. It has also been recognized that it would be advantageous to increase the ability to hold the electronic devices to resist dropping in the first place. It has been recognized that it would be advantageous to combine the function of the cell phone and a holder for such items.

The invention provides a stretchable strap cover device for a handheld electronic device with a length and a width and a perimeter. The stretchable strap cover device comprises a flexible and elastic pad having a thickness, a perimeter, a length and a width. Four apertures are formed in the pad and extend through the thickness of the pad. Four straps are defined between the four apertures and the perimeter of the pad. The pad has at least two configurations, including: 1) an initial configuration in which the pad is separate from the handheld electronic device, an in which the pad is unstretched with an initial unstretched perimeter, length and width, and in which the pad is flat and disposed in a flat layer having a thickness the same as the thickness of the pad, with the straps and the apertures disposed in the flat layer; and 2) an installed configuration in which the pad is configured to be coupled to the handheld electronic device, the pad being stretched and under tension, and the straps being disposed out of the flat layer In addition, the invention provides a stretchable strap cover device in combination with a handheld electronic device with a length and a width and a perimeter. The stretchable strap cover device comprises a flexible and elastic pad having a thickness, a perimeter, a length and a width. Four elongated slots are formed in the pad and extend through the thickness of the pad. Each slot has a length and a slot width transverse to the length, with the slot width being substantially constant along the length of the slot. Each of the slots is located at a different location around the perimeter of the pad. Each of the slots is oriented transverse with respect to a pair of adjacent slots on opposite sides thereof around the perimeter of the pad. Four straps are defined by the pad between the four slots and the perimeter of the pad. Each of the straps has a length and a strap width transverse to the length, with the strap width being substantially constant along the length of the strap. Each of the straps is oriented transverse with respect to a pair of adjacent straps on opposite sides thereof around the perimeter of the pad. The pad having at least two configurations, including: 1) an initial configuration in which the pad is separate from the handheld electronic device, and in which the pad is unstretched with an initial unstretched perimeter, length and width, and in which the pad is flat and disposed in a flat layer having a thickness the same as the a thickness of the pad, with the straps and the slots disposed in the flat layer, with the initial unstretched perimeter of the pad being smaller than, and contained within, the perimeter of the handheld electronic device; and 2) an installed configuration in which the pad is coupled to the handheld electronic device, the pad is stretched with each of the straps wrapped around a different corner of the handheld electronic device and has a subsequent stretched perimeter, length and width, with the stretched length and the stretched width of the pad being larger than the length and the width, respectively, of the handheld electronic device, and in which the pad is under tension, with the pad, or the straps and an intermediate portion of the pad, being disposed on six different sides of the handheld electronic device, the straps laying flat against surfaces of the handheld electronic device. The intermediate portion is intermediate the straps and the slots, and has an outer surface oriented to face outwardly with respect to the handheld electronic device when installed thereon. Indicia is disposed on the outer surface of the intermediate portion and is visible when the pad is installed on the handheld electronic device. The pad has at least three configurations in the installed configuration, including: 1) a cover configuration in which an inner surface of the intermediate portion of the pad is parallel with a rear surface of the handheld electronic device; 2) a hand tether configuration in which the inner surface of the intermediate portion of the pad is bowed outwardly away from the rear surface of the handheld electronic device to define a finger space therebetween; and 3) a card holder configuration in which the inner surface of the intermediate portion of the pad is spaced-apart from the rear surface of the handheld electronic device to define a gap sized to receive a credit card, driver's license, identification card, cash or combinations thereof sandwiched between the handheld electronic device and the pad.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a front view of a stretchable strap cover device in accordance with an embodiment of the invention, shown in an initial configuration in which the pad is separate from a handheld electronic device, an in which the pad is unstretched with an initial unstretched perimeter, length and width, and in which the pad is flat and disposed in a flat layer having a thickness the same as the a thickness of the pad;

FIG. 2 is a rear view of the stretchable strap cover device of FIG. 1;

FIG. 3 is a side view of the stretchable strap cover device of FIG. 1;

FIG. 4 is an end view of the stretchable strap cover device of FIG. 1;

FIG. 9 is a side view of the stretchable strap cover device of FIG. 1 shown disposed on the handheld electronic device, and shown in a hand tether configuration in which the inner surface of the intermediate portion of the pad is bowed outwardly away from the rear surface of the handheld electronic device to define a finger space therebetween;

FIG. 10 is a side view of the stretchable strap cover device of FIG. 1 shown disposed on the handheld electronic device, and shown in a card holder configuration in which the inner surface of the intermediate portion of the pad is spaced-apart from the rear surface of the handheld electronic device to define a gap sized to receive an item such as a credit card, driver's license, identification card, cash, or combinations thereof sandwiched between the handheld electronic device and the pad;

FIG. 16a is a front view of the stretchable strap cover device of FIG. 1 shown disposed on the handheld electronic device, and shown in the installed configuration in which the pad is coupled to the handheld electronic device, and with a lanyard coupled thereto;

FIG. 16b is a front view of another stretchable strap cover device in accordance with another embodiment of the present invention with a tab extending therefrom and having an aperture to receive a lanyard, and shown disposed on a handheld electronic device;

FIG. 16c is a front view of another stretchable strap cover device in accordance with another embodiment of the present invention with a lanyard extending therefrom, and shown disposed on a handheld electronic device;

FIG. 16d is a front view of another stretchable strap cover device in accordance with another embodiment of the present invention with a lanyard extending therefrom, and shown disposed on a handheld electronic device;

Figure 5:
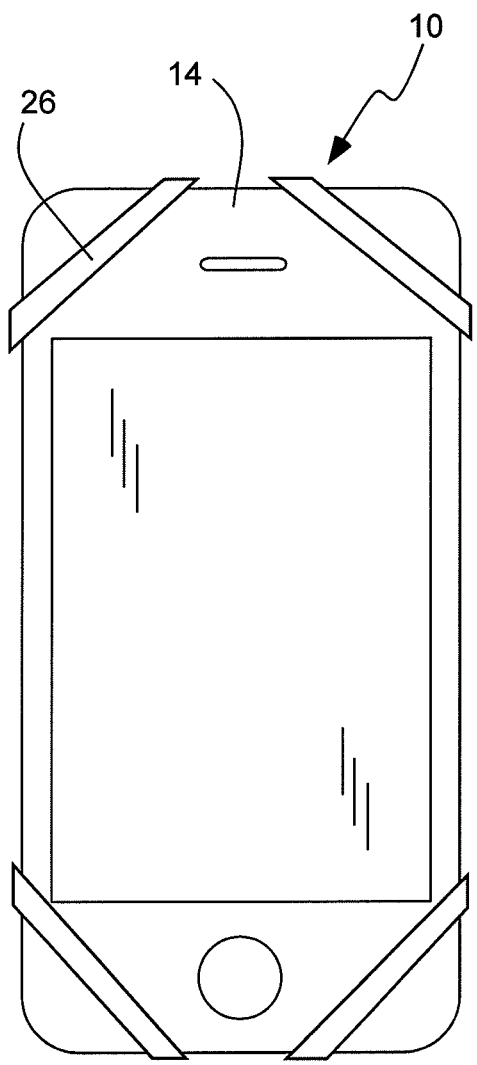
FIG. 5 is a front view of the stretchable strap cover device of FIG. 1 shown disposed on a handheld electronic device, namely a cell phone or smart phone, and shown in an installed configuration in which the pad is coupled to the handheld electronic device, and in which the pad is stretched and under tension.
Figure 6:
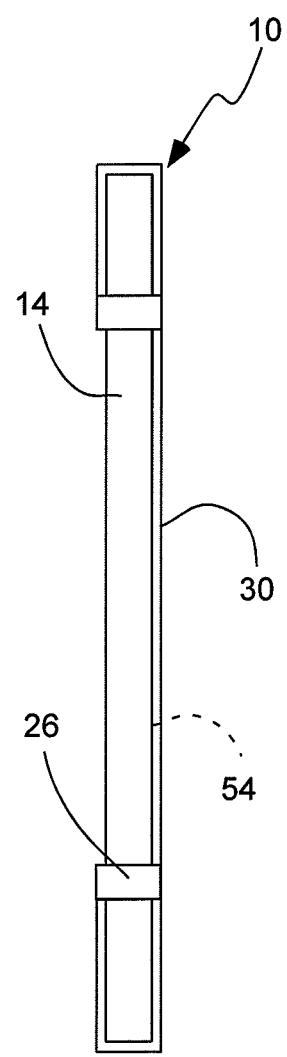
FIG. 6 is a side view of the stretchable strap cover device of FIG. 1, and shown in a cover configuration in which an inner surface of an intermediate portion of the pad is parallel with a rear surface of the handheld electronic device.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The term "handheld electronic device" is used broadly herein to refer to a portable, handheld portable electronic device, such as a cell or cellular phone or smart phone; a global positioning system (GPS) system; a digital music player (MP3 player, iPod® or the like); an electronic gaming system (Nintendo® DS; PSP®; etc.); a camera; a remote control; a personal digital assistant (PDA); a radio; a two-way radio; a citizens band radio; a walkie-talkie; a video recorder; a cassette player and/or recorder; a mini-cassette recorder; a DVD player; a portable television; a digital camera; a video camera; a portable computer (laptop computer, iPad®, or the like); a digital media player or tablet computer (such as an iPad® or the like); a radar detector; an e-book or e-reader (Kindle®, Nook®, iPad®, Sony Reader™, or the like), a television (TV) remote control, a remote control, a calculator, test equipment, monitoring equipment, medical devices, etc.

Description

Portable, handheld electronic devices, such as cell phones and tablets, are increasingly popular, and utilized more and more frequently. The portable and handheld nature of the devices lends them to everyday and continuous use. Such electronic devices, however, can be expensive, and prone to being dropped and damaged due to their small size, and sleek design. Thus, many people choose to place their cell phone or tablet in a case, such as a folio, that can have a cover foldable over the screen. Such covers or folios can be expensive. Electronic devices, such as cell phones, and tablets, however, come in many makes, styles, and sizes. It has been recognized that it would be advantageous to provide a minimalistic or simple cover that can extend over different sizes and shapes of electronic devices to protect the electronic device in case of dropping. It has also been recognized that it would be advantageous to increase the ability to hold the electronic devices to resist dropping in the first place. In addition, such electronic devices, such as cell phone, are increasingly functional and replacing other devices. Many individuals, however, still choose to carry other items, such as cash, credit cards, identification cards, membership cards, etc. It has been recognized that it would be advantageous to combine the function of the cell phone and a holder for such items.

The invention provides a stretchable strap cover that comprises a flexible and stretchable pad to extend around the sides of the electronic device. The ability of the cover to stretch makes it universally compatible with most electronic devices; allowing it to stretch to fit the device regardless of shape, size or model. The pad can have four slots or apertures in the four corners thereof, to form four straps that can extend over the four corners of the electronic device with the four corners of the electronic device received in the four slots or apertures. The pad can stretch to extend around the device, and can stretch around all six sides of the device to protect the device from scratches, dents or other damage, by separating the surfaces of the device from other surfaces. The pad can have an intermediate portion or web between the straps which can receive indicia indicative of or representing a business (or company or organization), a product or service, or both, such as a logo, message, slogan, etc. Thus, in one aspect, the stretchable strap cover can be utilized as a promotional item and can be provided by the businesses for promotional use. In another aspect, the stretchable strap cover can be used to customize or personalize the electronic device. The pad can also be formed of a material, such as silicone rubber, to increase or improve a user's grip on the electronic device. In addition, the pad and straps can provide additional contours to further enhance the ability to grip the electronic device. The pad, or intermediate portion or web thereof, can also stretch outwardly to receive one or more of a user's fingers, or hand, between the pad and the electronic device to further tether the electronic device to the user's fingers, or hand. In addition, items, such as cash, credit cards, identification cards, membership cards, etc. can be held between the pad and the electronic device to resist loss.

As illustrated in FIGS. 1-10, a stretchable strap cover or protector device, indicated generally at 10, in an example implementation in accordance with the invention is shown for use with, or disposed on, a portable, handheld electronic device 14, such as a cell phone. The handheld electronic device 14 can have a length and a width and a perimeter. In one aspect, the handheld electronic device can be rectangular, and have six sides (front, back, top, bottom, left and right), and four corners (associated with the front and back rectangular shape). The cover or protector comprises a flexible and elastic pad 18 that is flexible and elastic, and stretchable to extend around the back, sides, top and bottom, and front corners of the electronic device. In one aspect, the cover 14 and/or the pad 18 can comprise silicone. The pad also has a thickness, a perimeter, a length and a width. In one aspect, the cover 14 and/or the pad 18 can have a thickness of thickness between 3-4 mm. In another aspect, the cover 14 and/or the pad 18 can have a thickness between 1-2 mm. In another aspect, the cover 14 and/or the pad 18 can have a thickness of approximately 1.5 mm. Thinner pads with a thinner thickness, such as between 1-2 mm, can be used for smaller electronic devices, such as cell phones, while thicker pads with a thicker thickness, such as between 2-3 mm, can be used for larger electronic devices, such as tablet computers. In another aspect, the cover and/or the pad can have a thickness of 3-4 mm or more. The pad 18 can be flexible and elastic, and can stretch. The pad 18 can be formed of silicone or silicone rubber cured at 50 degrees Celsius to provide sufficient amount of stretch and strength. Thus, the pad can be sized smaller than the electronic device, or have a perimeter within the perimeter of the electronic device, but can be stretched to extend over and around the electronic device.

The stretchable strap cover 10, or the flexible and elastic pad 18, has four apertures, such as slots 22, formed in the pad and extending through the thickness of the pad. In one aspect, the apertures can be slots 22 with each slot having a length and a slot width, transverse to the length. The slot width can be substantially constant along the length of the slot. In addition, the length of the slot can be greater than the slot width so that the slot is elongated. Each of the apertures or slots 22 is located at different locations around the perimeter of the pad, corresponding to each of the four corners of the electronic device. In addition, each of the slots 22 is oriented transverse with respect to a pair of adjacent slots on opposite sides thereof around the perimeter of the pad. Opposite slots, opposite from one another, can be oriented parallel with respect to one another.

Figures 11, 12, 13:
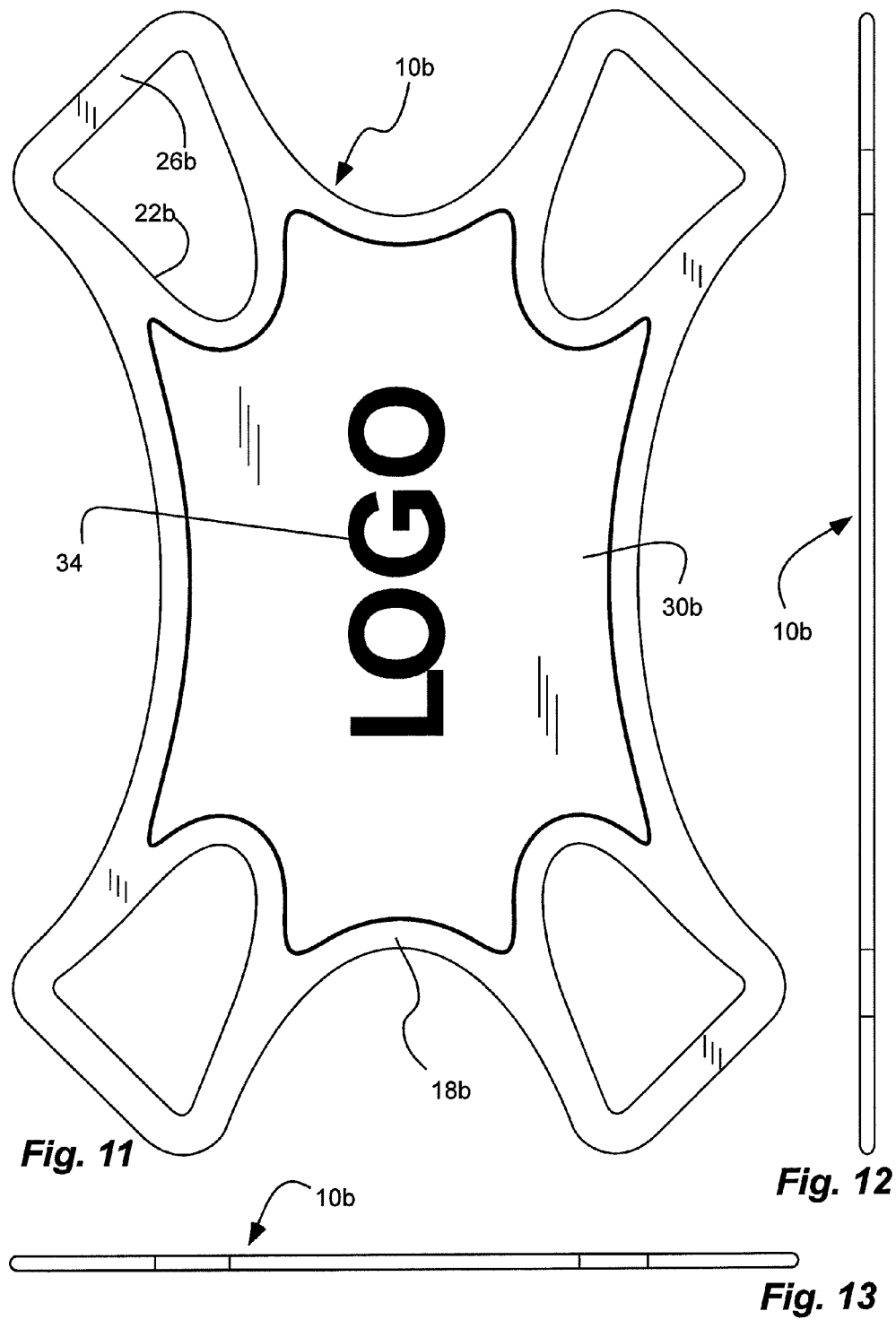
FIG. 11 is a front view of another stretchable strap cover device in accordance with another embodiment of the invention, shown in an initial configuration in which the pad is separate from a handheld electronic device, an in which the pad is unstretched with an initial unstretched perimeter, length and width, and in which the pad is flat and disposed in a flat layer having a thickness the same as the a thickness of the pad.
FIG. 12 is a side view of the stretchable strap cover device of FIG. 11.
FIG. 13 is an end view of the stretchable strap cover device of FIG. 11.
Figure 14:
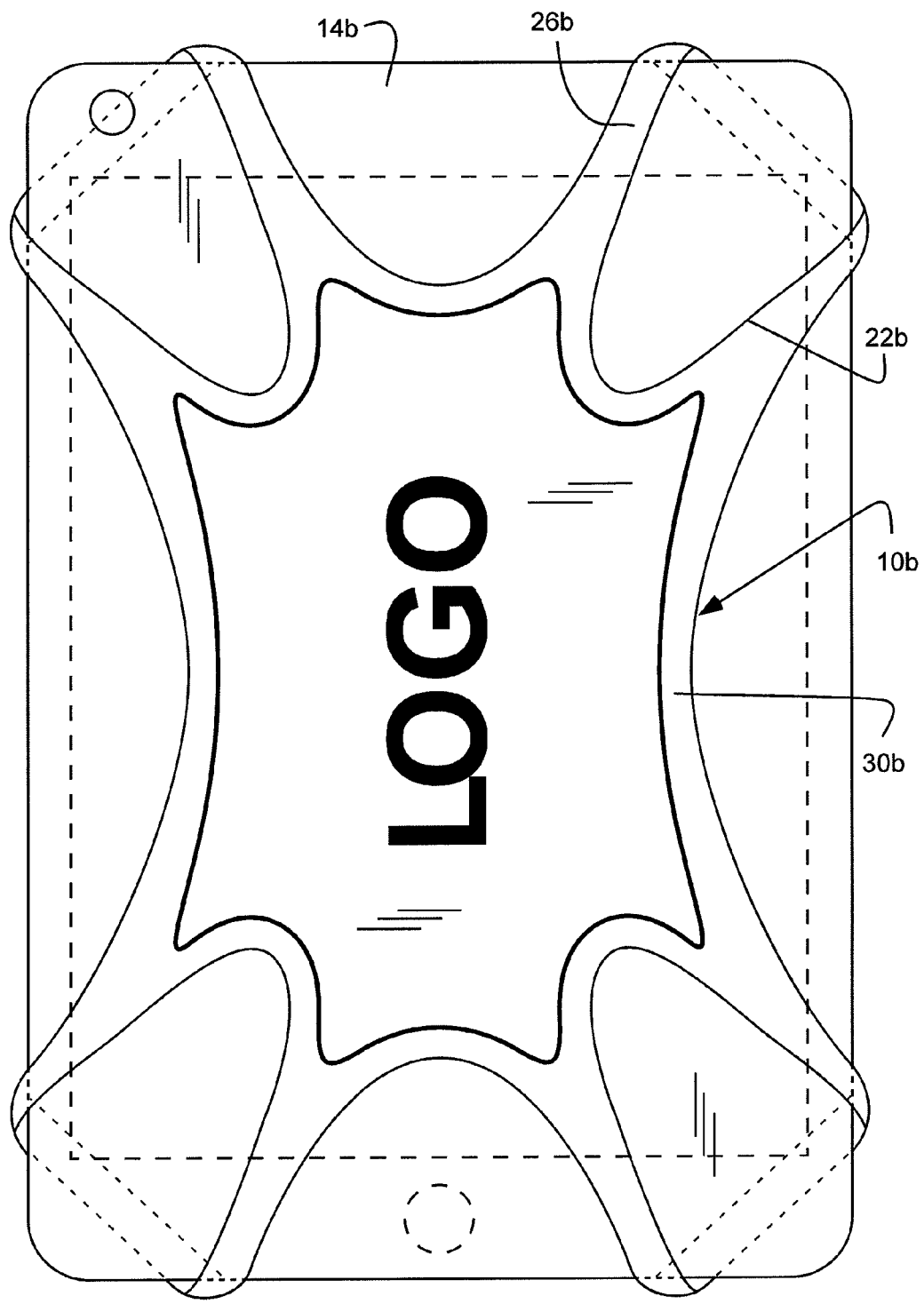
FIG. 14 is a front view of the stretchable strap cover device of FIG. 11 shown disposed on a handheld electronic device, namely a tablet computer, and shown in an installed configuration in which the pad is coupled to the handheld electronic device, and in which the pad is stretched and under tension.

In addition, the stretchable strap cover 10, or the flexible and elastic pad 18, has four straps 26 which are defined between the four apertures or slots 22 and the perimeter of the pad. The four straps can correspond to the each of the four corners of the electronic device. In one aspect, each of the straps 26 can have a length and a strap width, transverse to the length. The strap width can be substantially constant along the length of the strap. The length of the strap can be greater than the strap width so that the straps are elongated. Thus, the width and length of the strap can resist interference when disposed on the handheld electronic device. In addition, each of the straps is oriented transverse with respect to a pair of adjacent straps on opposite sides thereof around the perimeter of the pad. Opposite straps, opposite from one another, can be oriented parallel with respect to one another. Furthermore, the straps can be straight (in the initial configuration described below, and shown in FIGS. 1 and 11), or can have a substantially straight portion or intermediate portion, that is oriented diagonally, such as between 30-60 degrees in one aspect, or 40-50 degrees in another aspect, or at a substantially 45 degree angle in another aspect, with respect to horizontal and/or vertical (with respect to the width or the length of the cover or the pad). Similarly, the straps can extend across the front of the electronic device (in the installed configuration as described below, and shown in FIGS. 5, 7, 14 and 15) in a substantially straight configuration that is oriented diagonally, such as between 30-60 degrees in one aspect, or 40-50 degrees in another aspect, or at a substantially 45 degree angle in another aspect, with respect to horizontal and/or vertical (with respect to the width or the length of the cover or the pad or the electronic device). Thus, the orientation of the straps can help maintain the straps on the electronic device. In one aspect, the straps 26 can have a cross-sectional shape that is substantially rectangular to resist rolling or bunching when installed. Thus, the straps can lay flat on the surfaces of the electronic device.

Figures 7, 8:
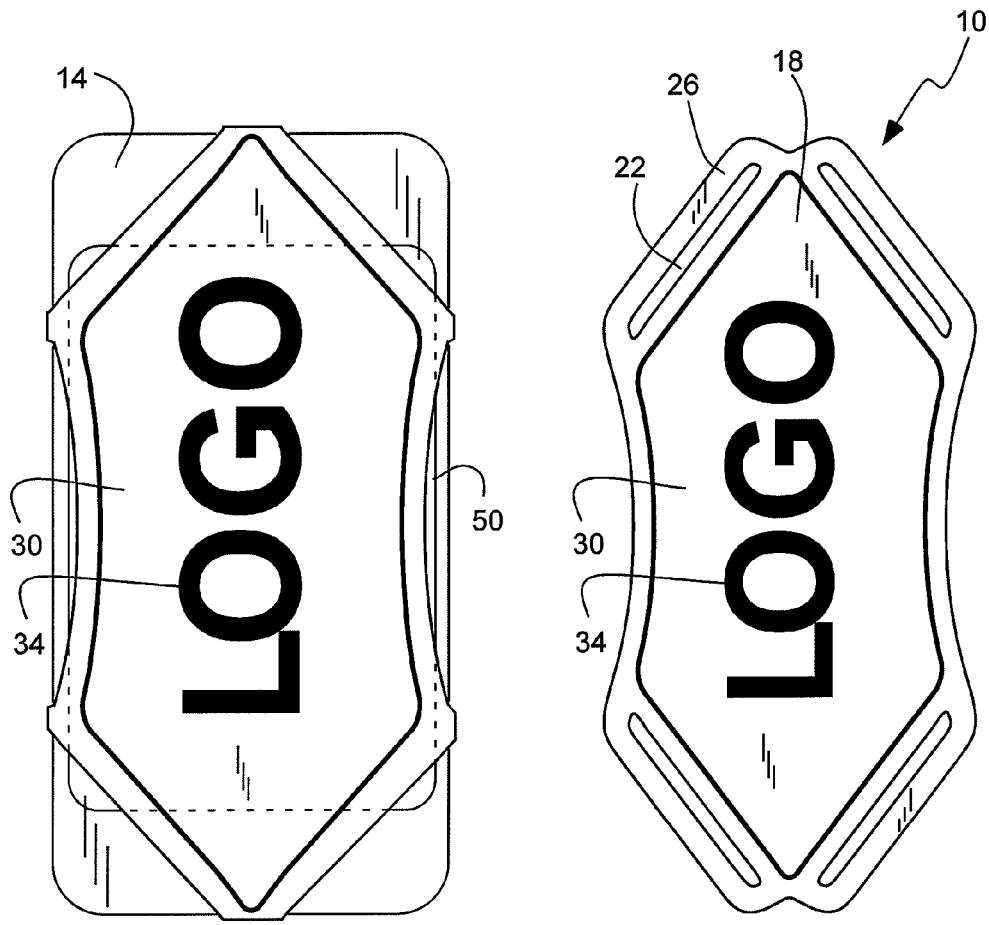
FIG. 7 is a front view of the stretchable strap cover device of FIG. 1 shown disposed on the handheld electronic device, and shown in an installed configuration in which the pad is coupled to the handheld electronic device, and in which the pad is stretched and under tension.
FIG. 8 is a front view of the stretchable strap cover device of FIG. 1.

The cover 10 and the pad 10 have an intermediate portion or web 30 that is intermediate the straps 26 and the slots 22, and that couples the straps to one another. The intermediate portion, 30, or cover and pad, have an outer surface oriented to face outwardly with respect to the handheld electronic device when installed thereon, as shown in FIG. 7. Indicia 34 can be disposed on the outer surface of the intermediate portion 30, and visible when the pad is installed on the handheld electronic device, again as shown in FIG. 7. The indicia can be indicative of or representing a business (or company or organization), a product or service, or both, such as a logo, message, slogan, etc. Thus, the cover 10 can be utilized as a promotional item. In one aspect, the indicia can be printed on the web. In another aspect, the indicia can be embossed or debossed in the web. In another aspect, the web can include one or more apertures, which can define the indicia. In one aspect, the web 30 can be sized much larger than the straps and slots, so that the web stretches less, and the indicia remains substantially the same when stretched. In another, aspect, the web 30 can be shaped and sized to stretch.

In one aspect, the pad 18 and the cover 10 can be solid except for the four slots 22 therein. Thus, the pad can be configured to cover more of the electronic device. In another, aspect, the pad can have multiple apertures and slots, other than the four described above, to facilitate stretching. In one aspect, the pad 18 with the straps 26 can be formed as a single, unitary, monolithic body, with the straps 26 formed integrally with the intermediate portion 30 at the same time. An inner surface of the pad 18 (or cover 10) and the straps 26 can have a glass or gloss finish, or a smoother surface than the outer surface, to increase grip with the electronic device, and/or items held between the electronic device and the pad (in the card holder configuration as described in greater detail below). The outer surface of the pad 18 (or cover) and straps 26 can have a matt finish, or a rougher or more contoured surface than the inner surface to facilitate griping the cover, and thus the electronic device.

The stretchable strap cover 10, or the flexible and elastic pad 18, has at least two configurations, including: an initial configuration (FIGS. 1-4) and an installed configuration (FIGS. 5-7, 9 and 10). In the initial configuration (FIGS. 1-4), the pad 18 and the cover 10 are separate from the handheld electronic device 14. In addition, the pad 18 is unstretched, with an initial unstretched perimeter, length and width. In one aspect, the initial unstretched perimeter of the pad 18 in the initial configuration is sized smaller than, and can be contained within, the perimeter of the handheld electronic device. Thus, the pad 18 or cover 10 can be carried with the electronic device in the initial configuration. Furthermore, the pad is flat and disposed in a flat layer having a thickness the same as the thickness of the pad, and with the straps 26 and the apertures 22 disposed in the flat layer.

In the installed configuration (FIGS. 5-7, 9 and 10), the pad 18 and the cover 10 are coupled to the handheld electronic device 14. In addition, the pad is stretched and under tension. In the installed configuration, the pad 18 is stretched with each of the straps wrapped around a different corner of the handheld electronic device. In addition, the pad 18, or the straps 26 and the intermediate portion 30 of the pad, are disposed on six different sides of the handheld electronic device when stretched in the installed configuration. Thus, the cover or pad can stretch around all six sides of the electronic device and protect all six surfaces of the device from scratches, dents or other damage, by separating the surfaces of the device from other surfaces. The straps 26 can lay flat against surfaces of the handheld electronic device in the installed configuration to resist bunching or twisting or rolling. As described above, the straps 26 can have a cross-sectional shape that is substantially rectangular to facilitate them laying flat. The straps rotate on an axis parallel to the straps and/or slots 180 degrees over the corners so that they lay flat on the opposite side of the electronic device to resist the straps from catching on pockets or other objects, and to resist rolling off the corners. The pad 18 has a subsequent stretched perimeter, length and width, with the stretched length and the stretched width of the pad being sized larger than the length and the width, respectively, of the handheld electronic device. Furthermore, the straps 26 are disposed out of the flat layer.

A method for installing the cover 10 and/or the pad 18 as described above on the handheld electronic device 10, comprises: 1) inserting a corner of the handheld electronic device 10 into one of the apertures 22 of the pad 18; stretching the pad 18 toward remaining corners of the handheld electronic device 10; and inserting remaining corners of the handheld electronic device into remaining apertures 22 of the pad 18. In addition, the straps 26 can be grasped and pulled over the corners of the handheld electronic device.

In addition, when installed, or in the installed configuration, the pad 18 and/or the cover 10 can have at least two configurations, including: a cover configuration (FIG. 6), and a hand tether configuration (FIG. 9). In the cover configuration (FIG. 6), the inner surface of the intermediate portion or web 30 of the pad 18 can be parallel with a rear surface of the handheld electronic device 10. Thus, the electronic device 14 and cover 10 have a low profile that facilitates mobility. In the hand tether configuration (FIG. 9), the inner surface of the intermediate portion or web 30 of the pad 18 is bowed outwardly away from the rear surface of the handheld electronic device 10 to define a finger space 38 therebetween that can receive one or more of the user's fingers 42.

A method for selectively tethering the electronic device 14 to a user's finger(s) 42 using the cover 10 as described above, comprises: 1) selectively inserting the user's finger 42 between the pad 18 and the handheld electronic device 14, defining the hand tether configuration; 2) holding the handheld electronic device 14 tethered to the user's finger 42; and 3) selectively removing the user's finger 42 from between the pad 18 and the handheld electronic device 14.

Furthermore, when installed, or in the installed configuration, the pad 18 and/or the cover 10 can have at least three configurations, further including a card holder configuration (FIG. 10). In the card holder configuration, the inner surface of the intermediate portion or web 30 of the pad 18 is spaced-apart from the rear surface of the handheld electronic device 14 to define a gap 46 sized to receive a credit card, driver's license, identification card, cash, or combinations thereof, represented at 50, sandwiched between the handheld electronic device 14 and the pad 18. The perimeter of the pad or cover, or the web or intermediate portion thereof, can have an indentation to allow a user to engage the item to remove the item, as shown in FIG. 7. Thus, a portion of the perimeter of the pad, in the installed configuration, can overlap a portion of a perimeter of the item, and can expose a portion of the perimeter of the item, as shown in FIG. 7. In addition, a portion of the perimeter of the item can be exposed by the slot in the installed configuration, as shown in FIG. 7.

A method for selectively holding an item 50 with the cover 10 as described above, comprises: 1) selectively inserting the item 50 between the pad 18 and the handheld electronic device 14, defining the card holder configuration; 2) holding the item 50 between the pad 18 and the handheld electronic device 14 under tension of the pad; and 3) selectively removing the item 50 from between the pad 18 and the handheld electronic device 10.

In one aspect, the perimeter sides of the pad 18 at the intermediate section or web 30 are straighter in the installed configuration that in the initial configuration. Thus, the indicia can have a first warped appearance in the initial configuration, and a second desired appearance in the installed configuration.

Figure 15:
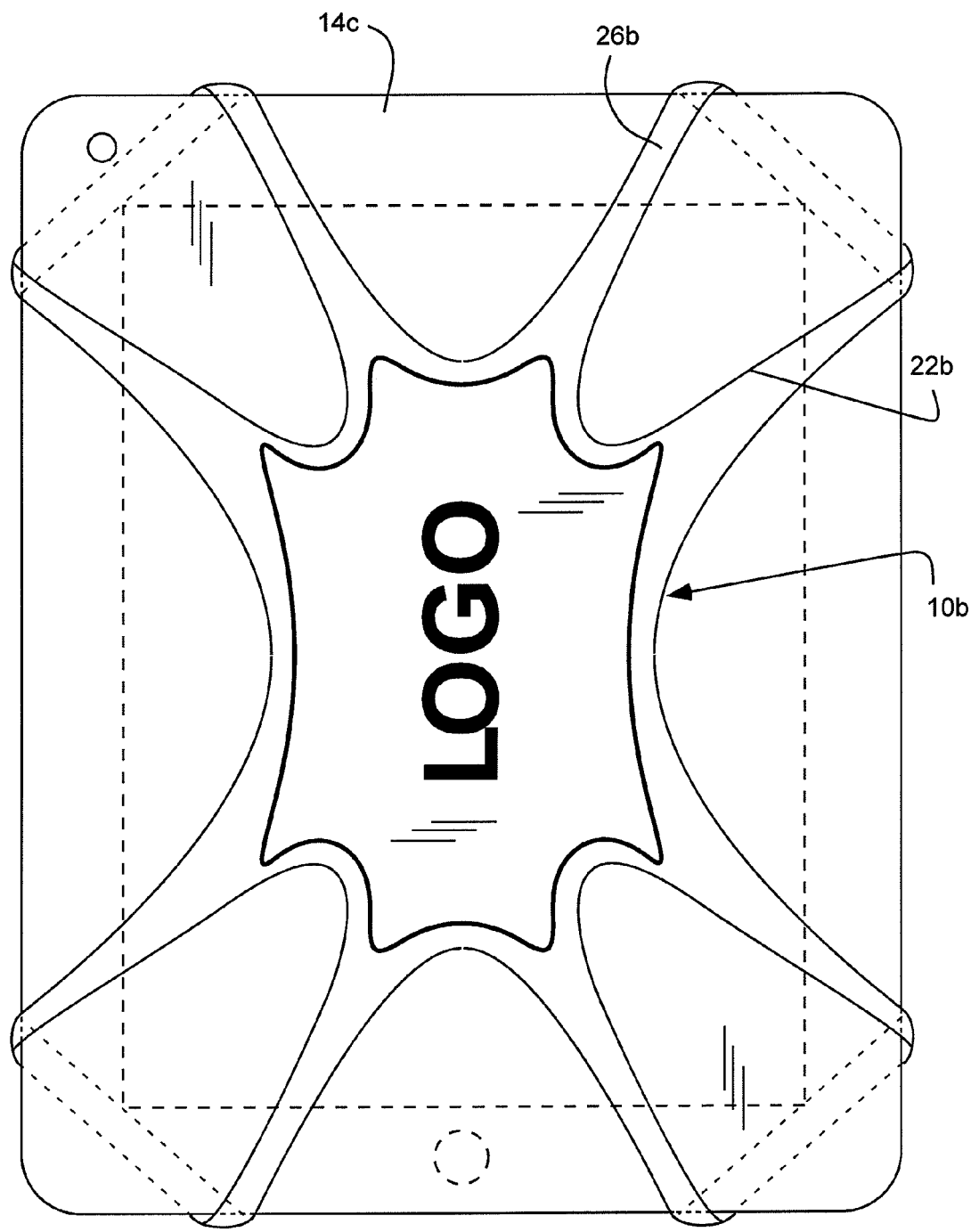
FIG. 15 is a front view of the stretchable strap cover device of FIG. 11 shown disposed on a handheld electronic device, namely a tablet computer, and shown in an installed configuration in which the pad is coupled to the handheld electronic device, and in which the pad is stretched and under tension.

Referring to FIGS. 11-15, another stretchable strap cover or protector device 10b in accordance with the invention is shown, and is similar in many respects to that described above, and which description is hereby incorporated herein by reference. The cover 10b is configured for use with a tablet computer, such as a smaller tablet computer 14b (FIG. 14) and a larger tablet computer 14c (FIG. 15). The cover 10b can have a thickness of approximately 2.5 mm, can be formed of silicone cured at 30-40 degrees Celsius to provide further stretching to fit larger and smaller tablet computers (as lower curing temperatures result in greater ability to stretch). The cover 10b and pad 18b can be larger, than that described above. A user can insert his or her whole hand between the pad and the tablet computer in the hand tether configuration. As described above, the cover 10b and/or the pad 18b has four apertures 22b, formed in the pad and extending through the thickness of the pad. In one aspect, the apertures can have a straight portion to form straight straps. The cover 10b and/or the pad 18b has four straps 26b which are defined between the four apertures 22b and the perimeter of the pad. An intermediate portion or web 30b is intermediate the straps 26b and the apertures 22b, and couples the straps to one another.

As described above, the cover and/or the pad can be sized and shaped for use with a cell phone, a tablet computer, a Global Positioning System (GPS), a digital music player, a digital media player, an electronic gaming system, and combinations thereof.

In addition, the cover and/or pad described above can also be used over a case, a cover, a skin, an applique, or combinations thereof (indicated at 54 in FIG. 6), that are disposed on the portable electronic device, with a portion thereof disposed between the portable electronic device and the pad. The inner surface of the pad can abutting to at least a portion of the case, the cover, the skin, the applique, or combinations thereof in the installed configuration and the cover configuration. Thus, the cover and/or pad described above can be utilized with other accessories.

In addition, the cover and/or pad described above can also be utilized to provide a platform to hold the electronic device to another device, and/or to receive an accessory to hold the electronic device to another device.

In addition, the cover and/or pad described above can also be utilized to attach the cover and the electronic device to another item, such as handle bars of a bicycle, motorcycle, scooter, a two-wheeled motorized personal vehicle consisting (Segway®), baby stroller, shopping cart, etc. As such, the handle bar can be inserted between the electronic device and the cover or the pad, such as in the hand tether configuration, but with the handle bar substituted for the user's fingers, as shown in FIG. 9.

Figure 17:
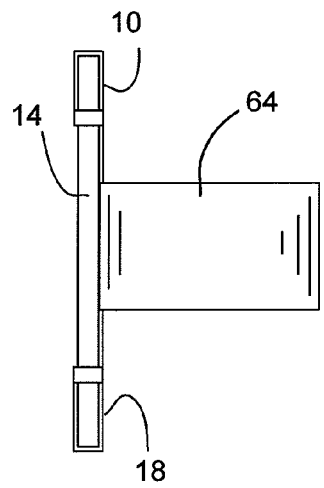
FIG. 17 is a side view of the stretchable strap cover device of FIG. 1, and shown in a cover configuration, and with a strap, band or belt coupled thereto.

In addition, the cover and/or pad described above can receive and/or be coupled to a lanyard 60, as shown in FIG. 16a. The lanyard 60 can be looped through the apertures or slots, or the straps, or between the pad 18 and the electronic device 10. Thus, the lanyard and the cover and/or pad can be utilized to hang the electronic device, such as from a user's neck. Similarly, the cover and/or pad described above can receive and/or be coupled to a strap or belt 64, as shown in FIG. 17. The belt 64 can be looped through the apertures or slots, or the straps, or between the pad 18 and the electronic device 10. Thus, the belt and the cover and/or pad can be utilized to strap the electronic device, such as a digital movie camera or a digital music player, to a part of a user's body, such as a head or torso of the user. The belt can define a loop, an arm band, head band, torso band, etc. The belt can be elastic, and can include a buckle, and can include an adjustment to adjust the size of a loop formed by the belt. The belt can also be a harness to hold the electronic device to another item, such as a car seat to position the electronic device on the back of a car seat for rear seat viewing.

In addition, the cover 10f and/or pad 18f described above can receive and/or be coupled to a lanyard 60, as shown in FIG. 16b. The cover 10f and/or pad 18f can have a tab 100 extending therefrom with an aperture to receive the lanyard 60. The tab can be formed integrally with the pad at the same time and of the same material. The tab can extend beyond a perimeter of the pad and the electronic device.

In addition, the cover 10g or 10h and/or pad 18g or 18h described above can have an integral lanyard 62 or 63 respectfully, as shown in FIGS. 16c and 16d. The lanyard can define a loop. The lanyard can be formed integrally with the pad at the same time and of the same material. In one aspect, the lanyard 62 can extend from a top of the pad 18g, as shown in FIG. 16c. In another aspect, the lanyard 63 can extend from a lateral side of the pad 18h, as shown in FIG. 16d.

Figure 22:
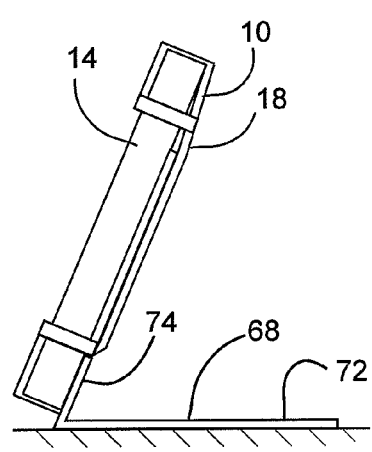
FIG. 22 is a side view of the stretchable strap cover device of FIG. 1 shown disposed on the handheld electronic device, and shown in the installed configuration in which the pad is coupled to the handheld electronic device, and coupled to a stand.

In addition, the cover and/or pad described above can receive and/or be coupled to a display stand 68, as shown in FIG. 22. The display stand 68 can be angled with a base 72 to be disposed on a support surface, such as a desk or table, and with a panel 74 angled with respect to base to be inserted between the electronic device 10 and the cover or pad 18 to hold the electronic device at an angle.

Figure 23:
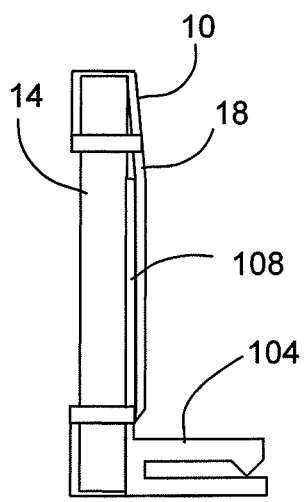
FIG. 23 is a side view of the stretchable strap cover device of FIG. 1 shown disposed on the handheld electronic device, and shown in the installed configuration in which the pad is coupled to the handheld electronic device, and coupled to a clip.

In addition, the cover and/or pad described above can receive and/or be coupled to a clip 104, as shown in FIG. 23. The clip 104 can be angled with flange 108 angled with respect to the clip to be inserted between the electronic device 10 and the cover or pad 18, and with the clip having a pair of arms to engage a vent or louver of a vent or grill of an air vent, such as on a vehicle, to hold the electronic device for viewing. The clip can allow for hands-free navigation, GPS, etc. in a vehicle.

Figure 21:
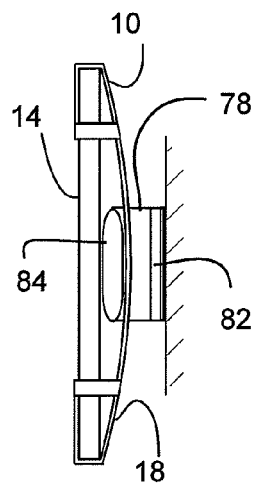
FIG. 21 is a side view of the stretchable strap cover device of FIG. 1 shown disposed on the handheld electronic device, and shown in the installed configuration in which the pad is coupled to the handheld electronic device, and coupled to a bracket or clip.

In addition, the cover and/or pad described above can receive and/or be coupled to a bracket or clip 78, as shown in FIG. 21. The clip 78 can have a base 82 with an adhesive to adhere the base to a surface, such as a dashboard, and a hook 84 extending from the base to be inserted between the electronic device 10 and the cover or pad 18 to hold the electronic device to the surface. The hook can be oriented laterally or vertically upwardly.

Furthermore, the cover and/or pad described above can also be utilized to attach the cover and the electronic device to another item, such as in the hand tether configuration. For example, a portion of a rear view mirror can be inserted between the electronic device and the cover or the pad with the cover or the pad facing the windshield and the electronic device facing inwardly. Thus, the screen of the electronic device can be used for navigation. In addition, the forward facing camera of the electronic device can be used for video capture outside the vehicle. Furthermore, the rearward facing camera of the electronic device can be sued for video capture inside the vehicle. The video angle can be easily adjusted by adjusting the angle of the rear view mirror, or ball joint thereof.

Figure 18:
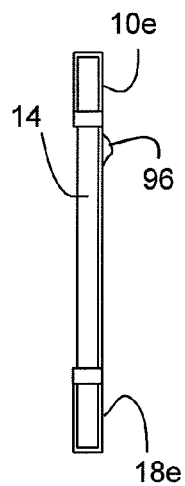
FIG. 18 is a side view of another stretchable strap cover device in accordance with another embodiment of the present invention with a bump or protrusion, and shown disposed on a handheld electronic device.
Figure 19:
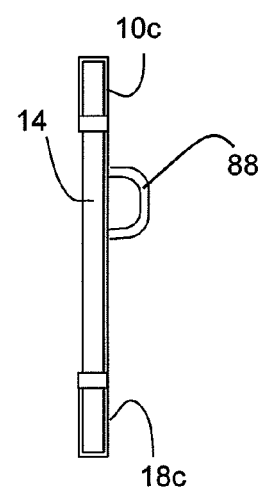
FIG. 19 is a side view of another stretchable strap cover device in accordance with another embodiment of the present invention with a loop or ring, and shown disposed on a handheld electronic device.
Figure 20:
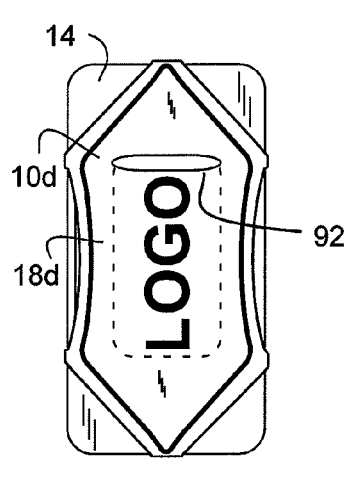
FIG. 20 is a front view of another stretchable strap cover device in accordance with another embodiment of the present invention with a pocket, and shown disposed on a handheld electronic device.

In addition, the cover and/or pad described above can include other features for securing the cover or pad, and thus the electronic device, to another object. For example, the cover 10c and/or pad 18c described above can also have a ring or loop 88 on the exterior thereof, opposite the electronic device, to receive a user's finger(s) to facilitate holding, as shown in FIG. 19. The loop can also be configured to receive another object, such as handle bars of a bicycle, motorcycle, scooter, a two-wheeled motorized personal vehicle consisting (Segway®), baby stroller, shopping cart, etc. The loop can be formed integrally with the pad at the same time and of the same material. Thus, the loop can stretch to fit over another object, and elastically contract to grip the object. As another example, the cover 10d and/or pad 18d described above can also have a pocket 92 for receiving another item, such as a key or card, as shown in FIG. 20. In one aspect, the pocket can be formed by a cavity in the pad. In another aspect, the pocket can be formed by another layer affixed to the pad around a majority of the perimeter. As another example, the cover 10e and/or pad 18e described above can also have a bump 96 or projection in the exterior thereof so that the electronic device can be set upon a support surface at an angle for viewing, etc., as shown in FIG. 18. The bump or protrusion can be a single bump or protrusion, or multiple bumps or protrusions. One or more bumps can also be utilized to improve grip by creating cavities or indentations therebetween, and angled surfaces with respect to the pad, to receive the user's fingers.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A stretchable strap cover device configured for a handheld electronic device with a length and a width and a perimeter, the stretchable strap cover device comprising:
    a) a flexible and elastic pad having a thickness, a perimeter, a length and a width;
    b) four apertures formed in the pad and extending through the thickness of the pad;
    c) four straps defined between the four apertures and the perimeter of the pad; and
    d) the pad having at least two configurations, including:
        i) an initial configuration in which the pad is separate from the handheld electronic device, an in which the pad is unstretched with an initial unstretched perimeter, length and width, and in which the pad is flat and disposed in a flat layer having a thickness the same as the thickness of the pad, with the straps and the apertures disposed in the flat layer; and
        ii) an installed configuration in which the pad is configured to be coupled to the handheld electronic device, the pad being stretched and under tension, and the straps being disposed out of the flat layer.

2. The device in accordance with claim 1, wherein:
    in the initial configuration, the initial unstretched perimeter of the pad is sized smaller than, and configured to be contained within, the perimeter of the handheld electronic device; and
    in the installed configuration, the pad is stretched with each of the straps configured to be wrapped around a different corner of the handheld electronic device and has a subsequent stretched perimeter, length and width, with the stretched length and the stretched width of the pad being sized larger than the length and the width, respectively, of the handheld electronic device.

3. The device in accordance with claim 1, wherein the four apertures further comprise four elongated slots; and wherein:
    a) each slot has a length and a slot width transverse to the length, the slot width being substantially constant along the length of the slot;
    b) each of the slots being located at different locations around the perimeter of the pad;
    c) each of the slots being oriented transverse with respect to a pair of adjacent slots on opposite sides thereof around the perimeter of the pad;
    d) each of the straps having a length and a strap width transverse to the length, the strap width being substantially constant along the length of the strap; and
    e) each of the straps being oriented transverse with respect to a pair of adjacent straps on opposite sides thereof around the perimeter of the pad.

4. The device in accordance with claim 1, wherein:
    a) the pad has an intermediate portion intermediate the straps and the apertures, and having an outer surface oriented to face outwardly with respect to the handheld electronic device when installed thereon; and
    b) indicia disposed on the outer surface of the intermediate portion and visible when the pad is installed on the handheld electronic device.

5. The device in accordance with claim 1, wherein the pad has at least two configurations in the installed configuration, including:
    1) a cover configuration in which an inner surface of the intermediate portion of the pad is configured to be parallel with a rear surface of the handheld electronic device; and
    2) a hand tether configuration in which the inner surface of the intermediate portion of the pad is configured to be bowed outwardly away from the rear surface of the handheld electronic device to define a finger space therebetween.

6. The device in accordance with claim 5, wherein the pad has at least three configurations in the installed configuration, further including:
    a card holder configuration in which the inner surface of the intermediate portion of the pad is configured to be spaced-apart from the rear surface of the handheld electronic device to define a gap sized to receive a credit card, driver's license, identification card, cash, or combinations thereof sandwiched between the handheld electronic device and the pad.

7. The device in accordance with claim 1, wherein the pad is solid except for the four apertures therein.

8. The device in accordance with claim 1, wherein the pad with the straps is formed as a single, unitary, monolithic body with the straps formed integrally with an intermediate portion at the same time.

9. The device in accordance with claim 1, wherein the pad, or the straps and an intermediate portion of the pad, are configured to be disposed on six different sides of the handheld electronic device when stretched in the installed configuration.

10. The device in accordance with claim 1, wherein the straps are configured to lay flat against surfaces of the handheld electronic device in the installed configuration.

11. The device in accordance with claim 1, wherein the inner surface of the pad comprises a gloss finish; and wherein the outer surface of the pad comprises a matt finish.

12. A method for installing the pad in accordance with claim 1 on the handheld electronic device, comprising:
    a) inserting a corner of the handheld electronic device into one of the apertures of the pad;

b) stretching the pad toward remaining corners of the handheld electronic device; and c) inserting remaining corners of the handheld electronic device into remaining apertures of the pad.

13. A method for selectively tethering the device in accordance with claim 12 to a user's finger or hand, comprising:

a) selectively inserting the user's finger or hand between the pad and the handheld electronic device, defining the hand tether configuration;

b) holding the handheld electronic device tethered to the user's finger or hand; and c) selectively removing the user's finger or hand from between the pad and the handheld electronic device.

14. A method for selectively holding an item with the device in accordance with claim 12, comprising:

a) selectively inserting the item between the pad and the handheld electronic device, defining the card holder configuration;

b) holding the item between the pad and the handheld electronic device under tension of the pad; and c) selectively removing the item from between the pad and the handheld electronic device.

15. The device in accordance with claim 1, wherein the pad is formed of silicon cured at 50 degrees Celsius.

16. The device in accordance with claim 1, wherein the pad has a thickness between 1-2 mm.

17. The device in accordance with claim 1, wherein the pad has a thickness between 2-3 mm.

18. The device in accordance with claim 1, wherein the straps have a cross-sectional shape that is substantially rectangular.

19. The device in accordance with claim 1, wherein perimeter sides of the pad at the intermediate section are straighter in the installed configuration that in the initial configuration.

20. The device in accordance with claim 1, further in combination with the handheld electronic device; wherein the handheld electronic device is selected from the group consisting of a cellular phone, a tablet computer, a Global Positioning System (GPS), a digital music player, a digital media player, an electronic gaming system, and combinations thereof.

21. The device in accordance with claim 1, wherein the straps a substantially straight portion that is oriented diagonally at a substantially 45 degree angle with respect to with respect to the width or the length of the pad.

22. A stretchable strap cover device in combination with a handheld electronic device with a length and a width and a perimeter, the stretchable strap cover device comprising:

a) a flexible and elastic pad having a thickness, a perimeter, a length and a width;

b) four elongated slots formed in the pad and extending through the thickness of the pad;

c) each slot having a length and a slot width transverse to the length, the slot width being substantially constant along the length of the slot;

d) each of the slots being located at different locations around the perimeter of the pad;

e) each of the slots being oriented transverse with respect to a pair of adjacent slots on opposite sides thereof around the perimeter of the pad;

f) four straps defined by the pad between the four slots and the perimeter of the pad;

g) each of the straps having a length and a strap width transverse to the length, the strap width being substantially constant along the length of the strap;

h) each of the straps being oriented transverse with respect to a pair of adjacent straps on opposite sides thereof around the perimeter of the pad;

i) the pad having an intermediate portion intermediate the straps and the slots, and having an outer surface oriented to face outwardly with respect to the handheld electronic device when installed thereon;

j) indicia disposed on the outer surface of the intermediate portion and visible when the pad is installed on the handheld electronic device;

k) the pad having at least two configurations, including:

1) an initial configuration in which the pad is separate from the handheld electronic device, and in which the pad is unstretched with an initial unstretched perimeter, length and width, and in which the pad is flat and disposed in a flat layer having a thickness the same as the a thickness of the pad, with the straps and the slots disposed in the flat layer, with the initial unstretched perimeter of the pad being smaller than, and contained within, the perimeter of the handheld electronic device; and 2) an installed configuration in which the pad is coupled to the handheld electronic device, the pad is stretched with each of the straps wrapped around a different corner of the handheld electronic device and has a subsequent stretched perimeter, length and width, with the stretched length and the stretched width of the pad being larger than the length and the width, respectively, of the handheld electronic device, and in which the pad is under tension, with the pad, or the straps and the intermediate portion of the pad, being disposed on six different sides of the handheld electronic device, the straps laying flat against surfaces of the handheld electronic device;

l) the pad having at least three configurations in the installed configuration, including:

1) a cover configuration in which an inner surface of the intermediate portion of the pad is parallel with a rear surface of the handheld electronic device;

2) a hand tether configuration in which the inner surface of the intermediate portion of the pad is bowed outwardly away from the rear surface of the handheld electronic device to define a finger space therebetween; and 3) a card holder configuration in which the inner surface of the intermediate portion of the pad is spaced-apart from the rear surface of the handheld electronic device to define a gap sized to receive a credit card, driver's license, identification card, cash or combinations thereof sandwiched between the handheld electronic device and the pad.

23. A stretchable strap cover device in combination with a handheld electronic device with a length and a width and a perimeter, the stretchable strap cover device comprising:

a) a flexible and elastic pad having a thickness, a perimeter, a length and a width;

b) four elongated slots formed in the pad and extending through the thickness of the pad;

c) each slot having a length and a slot width transverse to the length, the slot width being substantially constant along the length of the slot;

d) each of the slots being located at different locations around the perimeter of the pad;

e) each of the slots being oriented transverse with respect to a pair of adjacent slots on opposite sides thereof around the perimeter of the pad;

f) four straps defined by the pad between the four slots and the perimeter of the pad;

g) each of the straps having a length and a strap width transverse to the length, the strap width being substantially constant along the length of the strap;

h) each of the straps being oriented transverse with respect to a pair of adjacent straps on opposite sides thereof around the perimeter of the pad;

i) the pad having an intermediate portion intermediate the straps and the slots, and having an outer surface oriented to face outwardly with respect to the handheld electronic device when installed thereon;

j) indicia disposed on the outer surface of the intermediate portion and visible when the pad is installed on the handheld electronic device;

k) the pad being solid except for the four slots therein;

l) the pad with the straps being formed as a single, unitary, monolithic body with the straps formed integrally with the intermediate portion at the same time;

m) the pad having at least two configurations, including:
  1) an initial configuration in which the pad is separate from the handheld electronic device, and in which the pad is unstretched with an initial unstretched perimeter, length and width, and in which the pad is flat and disposed in a flat layer having a thickness the same as the a thickness of the pad, with the straps and the slots disposed in the flat layer, with the initial unstretched perimeter of the pad being smaller than, and contained within, the perimeter of the handheld electronic device; and
  2) an installed configuration in which the pad is coupled to the handheld electronic device, the pad is stretched with each of the straps wrapped around a different corner of the handheld electronic device and has a subsequent stretched perimeter, length and width, with the stretched length and the stretched width of the pad being larger than the length and the width, respectively, of the handheld electronic device, and in which the pad is under tension, with the pad, or the straps and the intermediate portion of the pad, being disposed on six different sides of the handheld electronic device, the straps laying flat against surfaces of the handheld electronic device;

n) the pad having at least three configurations in the installed configuration, including:
  1) a cover configuration in which an inner surface of the intermediate portion of the pad is parallel with a rear surface of the handheld electronic device;
  2) a hand tether configuration in which the inner surface of the intermediate portion of the pad is bowed outwardly away from the rear surface of the handheld electronic device to define a finger space therebetween; and
  3) a card holder configuration in which the inner surface of the intermediate portion of the pad is spaced-apart from the rear surface of the handheld electronic device to define a gap sized to receive a credit card, driver's license, identification card, cash or combinations thereof sandwiched between the handheld electronic device and the pad; and o) the inner surface of the pad comprising a glass finish; and the outer surface of the pad comprising a matt finish.

24. The combination in accordance with claim 23, further comprising:

a case, a cover, a skin, an applique, or combinations thereof, disposed on the portable electronic device with a portion thereof disposed between the portable electronic device and the pad; and the inner surface of the pad abutting to at least a portion of the case, the cover, the skin, the applique, or combinations thereof in the installed configuration and the cover configuration.

\* \* \* \* \*